Aug. 19, 1969  J. R. HAM  3,461,587

IDENTIFICATION TAG FOR LIVESTOCK ANIMALS

Filed May 8, 1967

INVENTOR
JOHN RICKELS HAM

BY Browne, Schuyler & Beveridge

ATTORNEYS

United States Patent Office 3,461,587
Patented Aug. 19, 1969

3,461,587
IDENTIFICATION TAG FOR LIVESTOCK ANIMALS
John Rickels Ham, Rte. 2, Elmore City, Okla. 73035
Filed May 8, 1967, Ser. No. 636,771
Int. Cl. G09f 3/60
U.S. Cl. 40—300            12 Claims

ABSTRACT OF THE DISCLOSURE

An animal identification tag includes an indicia-carrying plate adapted to lie flat against the nose portion of the animal. A pair of parallel arms extend rearwardly from the plate and a cross arm member is attached to the parallel arms in parallel relation to the plate.

BACKGROUND OF THE INVENTION

This invention pertains to a device useful in the field of animal husbandry for marking cattle and other livestock animals for identification.

It is particularly desirable when raising livestock to be capable of identifying individual animals or those animals which belong in a particular group or herd. Usually when animals are marked with identification tags, there is difficulty in reading the tags under normal circumstances. This is due to the fact that identification tags are either located at a position on the animal where they are obscured from view or because the tags are capable of turning freely to position where the marking indicia cannot be read.

Of course, both of the above-listed disadvantages are present when an identification tag is permitted to hang loosely on a chain placed around the neck of an animal. This is also the case with hog nose rings described in U.S. Patent 243,064 to Peter Drais. Hog rings of the type there disclosed have a marking tag which hangs from an animal's nose ring; however, they are difficult to read because the marking tag may turn freely from side to side. Moreover, such devices are designed specifically to limit an animal's ability to place its nose or snout against the ground.

United States patent specification 2,345,292 to William F. Schacht involves a cattle marking device in which an identification tag is located on a forward portion of the animal's head between the eyes. The tag hangs from a chain which encircles the horns of the animal, and therefore it is both unduly complicated and limited to use with horned animals.

Contrasted to the known prior art, the present invention is particularly advantageous because it provides an unusually simple, easily observed, permanent and conveniently applied identification tag which does not interfere with the eating habits of the marked animals.

SUMMARY

The invention disclosed herein is a marking device for livestock animals which employs an indicia-carrying plate member which is held substantially flat against the broad nose portion of a cow or other animal. A set of arms which extend behind the rear side of the plate form, either alone or in combination with the plate, a loop of which a portion may be inserted through the nostrils of an animal. Mating connectable securing means in the loop are connected to close the loop after one of the arms is inserted through the animal's nostrils.

Preferably, the arm structure includes a pair of parallel arms extending rearwardly from the plate and connected together at their outer ends by a cross arm member which is parallel to the plate. The cross-arm member is spaced from the plate by a distance of from ½ inch to ¾ inch, and the cross arm member is from 1½ inches to 2 inches in length, thus making it suitable for use with cattle.

The more significant advantages resulting from this invention are that the identification tag may not be readily turned so as to render it unobservable, and it does not interfere with the normal eating habits of the animal. Moreover, it is easily attached to an animal by virtue of a connectable securing device which has a pointed insert capable of penetrating the thin membrane in the nasal passage of cattle. The objects of this invention are to solve the pre-existing problems discussed above and to provide the advantages set forth herein.

BRIEF DESCRIPTION OF THE DRAWING

The drawings of this application illustrate but one of numerous possible embodiments of the invention.

DESCRIPTION OF THE PREFERRED EMBODIMENT

The embodiment of the invention described in this specification is particularly adapted for use in marking cattle, which is the area where it is believed the invention will have its greatest utility.

It is well-known that cattle have a nose which is broad, flat and oval with a tender sensitive covering, and that it is desirable to permit cattle to graze freely with their noses very close to the ground in order to eat natural roughage, grass or hay. The identification tag of this invention is particularly useful when grazing such animals, since it in no way interferes with the eating habits of the cattle. This is because the identification plate lies closely against the animal's nose. This close relationship between the identification plate and the animal's nose also is of advantage because it prevents the tag from turning to positions where it would be unreadable.

Figure 1:
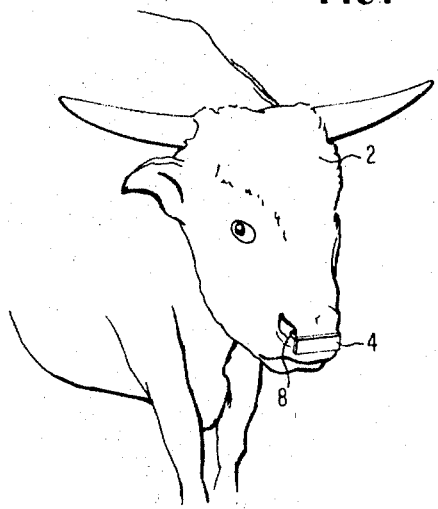
FIG. 1 is a perspective view of a portion of a bovine animal to which an identification tag has been attached.

Referring to FIG. 1, it will be seen that the animal 2 is carrying the identification plate 4 at the broad, flat oval portion of its nose. The plate may carry identifying indicia in the form of a color code, letters, numerals or a combination of any such designations. Arms which extend rearwardly from the plate pass through the nostrils of the animal to maintain the plate in its proper position.

Figure 2:
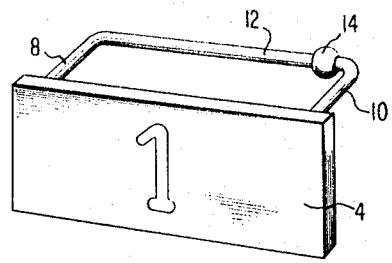
FIG. 2 is a perspective view of an identification tag removed from the animal.

One suitable construction of the arms of the device is illustrated in FIG. 2. There it will be seen that a pair of parallel arms 8 and 10 are attached to and extend rearwardly from the plate 4. Each of the arms 8 and 10 is attached at its outer end and to a cross arm member 12 which lies parallel to the plate 4. The plate 4 and the arms 8, 10 and 12 act together to form a continuous loop which lies in a plane generally perpendicular to the plane of the plate 4. This loop includes the securing means 14 which is described in greaater detail below. The securing means 14 is offset toward one end of the cross arm 12 so that it will not lie within an animal's nasal passage.

In order to insure the greatest comfort for the animal and the readability of the identification device when used on cattle, the length of the arms 8 and 10, and hence the distance between the plate 4 and the cross arm member 12 is from ½ inch to ¾ inch. The length of the cross arm 12 is from 1½ inches to 2 inches. Therefore, the preferred total length of the arms 8, 10 and 12 is from 2½ to 4 inches.

Figure 4:
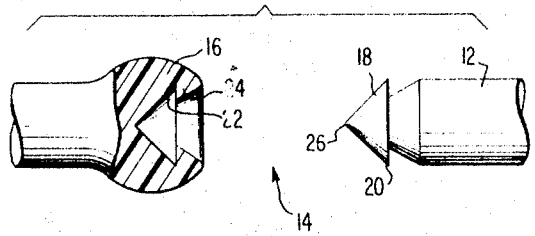
FIG. 4 is a view of the connectable securing means used for securing the identification tag to an animal.
Figure 3:
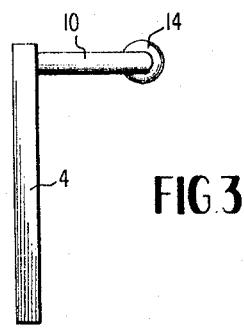
FIG. 3 is a side elevation of the identification tag.
Figure 5:
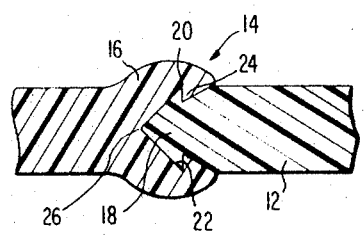
FIG. 5 is a sectional view of the connectable securing means of FIG. 4, with the mating members in their attached positions.

As illustrated in FIGS. 4 and 5, the mutually connectable securing means includes a socket member 16 and a pointed insert member 18 which is adapted to be placed into and locked within the socket member 16. The pointed insert member is integral with the longer portion of the cross arm. FIG. 5 shows the members 16 and 18 locked together in a manner whereby the external radial ridge 20 of the insert member is locked within the internal radial recess 22 of the socket member. The internal ridge 24 of the socket prevents removal of the insert member. In its locked position, the securing means 14 has a smooth and rounded outer surface so that it will not irritate the tender skin in the nose area of a bovine animal.

The pointed end 26 on the insert member is important when placing the identification tag on an animal due to the presence of a thin membrane which lies in the nasal passage between the nostrils of a bovine animal. It will be appreciated that as the member 18 is inserted through the nasal passage, the point 26 will penetrate the membrane and thus simplify the procedure of attaching the device to an animal. Then the insert member 18 is locked within the socket member 16 to secure the device permanently to the animal.

Preferably, the entire identification tag is a unitary piece of resilient elastomeric material which, of course, has the necessary characteristics of resilience to permit satisfactory operation of the mutually connectable securing means 14. However, the device may be made of plural pieces interconnected in any suitable manner to provide the desired performance and dimensions.

From the foregoing specification, it will be appreciated that the present invention provides a simple and useful identification tag for livestock animals which overcomes the shortcomings of prior art devices in this field in that it is always maintained in a readable position, it is easily attached to an animal and it does not interfere with the normal grazing habits of the animal.

Numerous modifications to this invention will occur to those working in the field of animal husbandry. It is expressly intended that this invention and this specification encompass all such modifications which fall within the spirit of this invention and within the terms of the following claims.

I claim:

1. A nose-supported marking device for livestock animals comprising a plate for carrying marking indicia, a cross arm having a rounded cross section and lying parallel to said plate and being spaced from and fixedly oriented with respect to said plate by a distance of ½ inch to ¾ inch, said cross arm having a rounded cross section to minimize irritation of the animal, and means connecting said plate and said cross arm.

2. A marking device according to claim 1 in which said means connecting the plate and the cross arm is two parallel arm portions.

3. A marking device according to claim 2 having clasp means connecting together portions of said cross arm.

4. A marking device for livestock animals, comprising, a plate for carrying marking indicia, arms attached to said plate and forming a closed loop which lies generally perpendicular to said plate, said loop including a cross arm which is parallel to and fixedly oriented with respect to the plate, and mating connectable securing means in said loop permitting insertion of one of said arms through the nostrils of an animal and the closing of said loop to secure said plate to an animal, said securing means including a socket member and a pointed insert member which has means for engaging said socket member.

5. A marking device according to claim 4 in which the total length of said arms is from 2½ inches to 4 inches.

6. A marking device according to claim 4 in which the distance between the cross arm and the plate is from ½ inch to ¾ inch.

7. A marking device for livestock animals, comprising, a plate for carrying marking indicia, a pair of parallel arms spaced apart from 1½ inches to 2 inches and extending rearwardly from said plate, a cross arm interconnecting said spaced apart arms, and lying parallel to said plate at a distance from ½ inch to ¾ inch from said plate, said arms having a pair of mutually separable connector members displaced from the center of said cross arm for permitting insertion of said cross arm through the nostrils of an animal; said separable connector members being a resilient socket member with a bore having an internal radial recess, and a pointed insert capable of insertion into said bore and having an external radial ridge for locking within said recess.

8. A marking device according to claim 7 which comprises a unitary piece of resilient elastomeric material.

9. A marking device according to claim 8 in which the maximum dimension of said plate measured on an axis perpendicular to said cross arm is 1½ inches.

10. A marking device for livestock animals comprising a unitary piece of resilient elastomeric material which includes a plate member for carrying marking indicia adapted to lie substantially flat against an animal's nose, a pair of spaced apart arm members extending rearwardly from said plate, a cross arm member attached to said arms and lying in spaced parallel relation to said plate at a fixed distance from the plate, a plurality of said members being attached together to form a continuous loop, and mating connectable securing means in said continuous loop, said securing means including a socket member and a pointed insert member adapted to be inserted into and locked within said socket member, and cooperating engaging means on the exterior of said insert member and the interior of said socket; whereby said cross arm member may be inserted through the nostrils of an animal and said securing means may be connected to close the loop and fix the marking device to an animal.

11. A marking device according to claim 10 in which the length of said cross arm member is from 1½ inches to 2 inches.

12. A marking device according to claim 10 in which the fixed distance between said plate and said cross arm member is from ½ inch to ¾ inch.

References Cited

UNITED STATES PATENTS

| 2,654,169 | 10/1953 | Dryden | 40—302 |
| 154,460 | 8/1874 | Decker | 119—135 |
| 3,205,602 | 9/1965 | Trinkle | 40—300 |

FOREIGN PATENTS

| 1,385,691 | 12/1964 | France. |
| 135,069 | 10/1962 | Germany. |

EUGENE R. CAPOZIO, Primary Examiner

WILLIAM H. GRIEB, Assistant Examiner

U.S. Cl. X.R.

119—135